Nov. 24, 1964  N. O. KRENKE  3,158,405
PNEUMATIC CONVEYOR SYSTEM
Filed Nov. 2, 1961  3 Sheets-Sheet 1

INVENTOR.
NORMAN O. KRENKE
BY
ATTORNEYS

Nov. 24, 1964  N. O. KRENKE  3,158,405
PNEUMATIC CONVEYOR SYSTEM
Filed Nov. 2, 1961  3 Sheets-Sheet 2
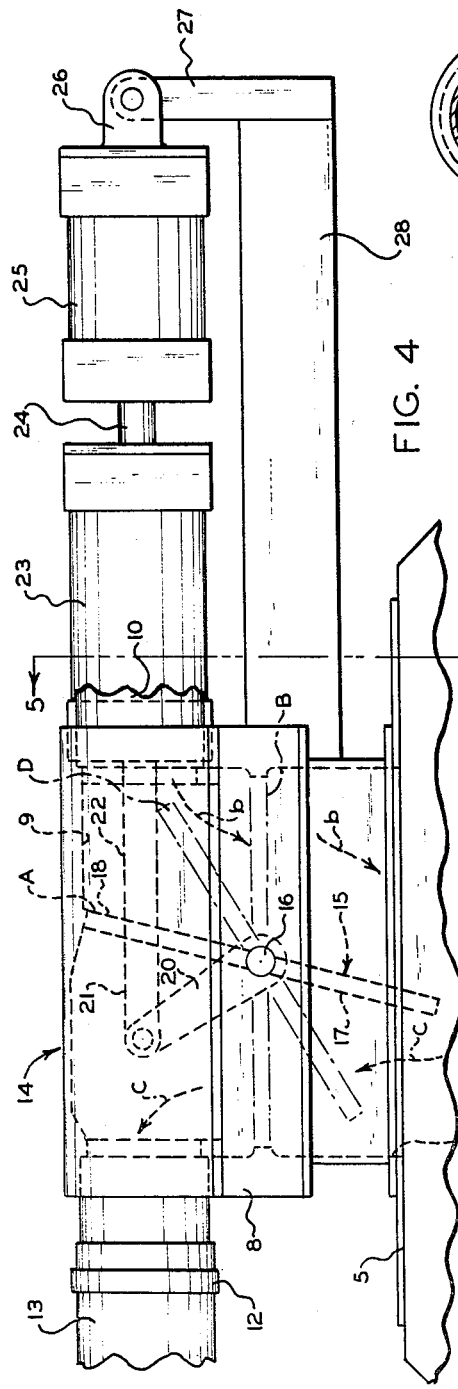
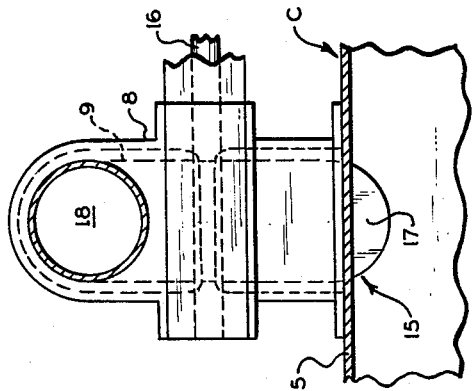
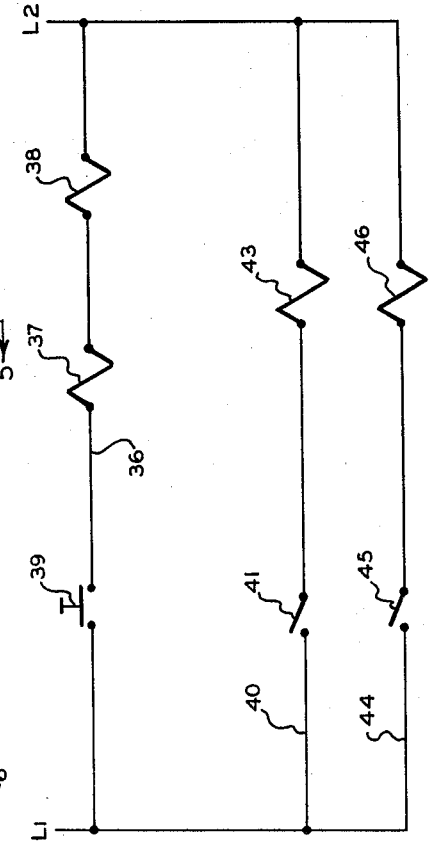
*INVENTOR.*
NORMAN O. KRENKE
BY
ATTORNEYS

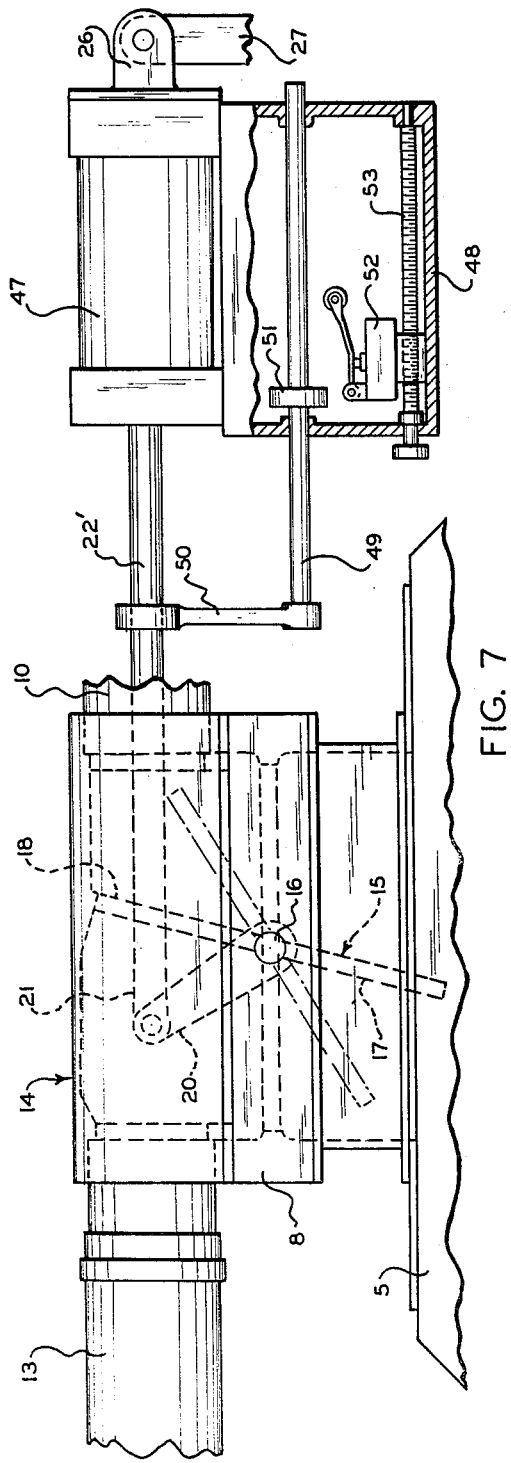
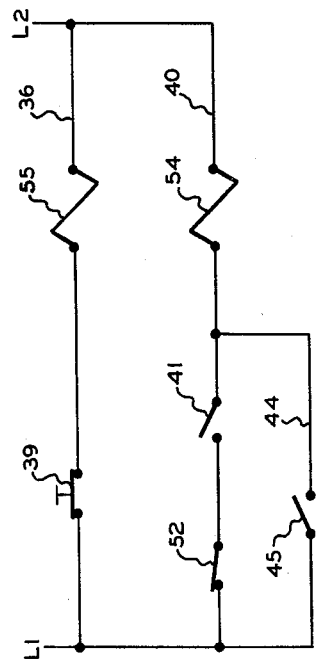
FIG. 7
FIG. 8
INVENTOR.
NORMAN O. KRENKE
BY
ATTORNEYS

United States Patent Office 3,158,405
Patented Nov. 24, 1964

3,158,405
PNEUMATIC CONVEYOR SYSTEM
Norman O. Krenke, Saginaw, Mich., assignor to Baker Perkins Inc., Saginaw, Mich., a corporation of New York
Filed Nov. 2, 1961, Ser. No. 149,606
3 Claims. (Cl. 302—3)

This invention relates to pneumatic conveying systems and methods for regulating the flow of an entrained, finely divided material such as flour or the like to a container such as a flour scaling hopper for use in conjunction with a dough mixing machine, and more particularly to apparatus and methods for delivering a predetermined quantity of the material to the hopper with a minimum of turbulence and with a minimum likelihood that more or less than the predetermined quantity of material will be presented to the container.

An object of the invention is to provide a system for introducing material to the hopper at a relatively rapid rate until such time as a predetermined quantity of material is within the container, whereupon the rate of delivery of material to the container is decreased, thereby allowing the container to be filled to a selected level with a minimum amount of turbulence.

Another object of the invention is to provide a method of regulating the flow of material to such a container in which material is introduced to the container at a relatively rapid rate until such time as the container is nearly full, whereupon the filling of the container proceeds at a relatively slower rate.

A further object of the invention is to provide in an apparatus and method of the kind referred to automatically operable means for regulating the flow of material in accordance with the quantity of material contained in the container.

Another object of the invention is to provide an apparatus of the character described and including means for indicating when the container is empty and loaded to the preset weight.

Other objects and advantages of the invention will be pointed out specifically or will become apparent from the following description when it is considered in conjunction with the appended claims and the accompanying drawings, in which:

FIGURE 4 is an enlarged, fragmentary detail of another portion of the apparatus shown in FIGURE 1;

FIGURE 5 is a sectional view taken on the line 5—5 of FIGURE 4;

FIGURE 6 is a schematic wiring diagram of electrical components incorporated in the regulating apparatus;

FIGURE 7 is a view somewhat similar to FIGURE 4, but illustrating a modified form of the apparatus; and FIGURE 8 is a schematic wiring diagram of the parts adapted for use with the construction shown in FIGURE 7.

The pneumatic conveyor system constructed in accordance with the invention includes a hollow container C of the kind adapted to receive a measured amount of finely divided material such as flour from an air stream. The container may include a harness 1 having three or more arms 2 extending outwardly from the container and being connected to straps or arms 3 which in turn are connected to springs or other resilient members 4 by means of which the container may be suspended yieldably from an overhead support (not shown) so as to move vertically in accordance with a change in the quantity of material in the container. This structure is intended only as illustrative of members which could be used and it is to be understood various supporting structures may be employed.

Figure 1:
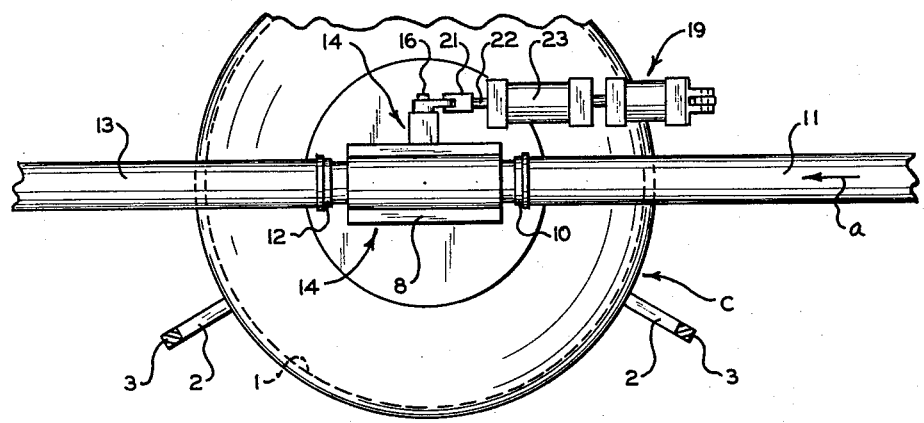
FIGURE 1 is a fragmentary, top plan view of a container and material delivery means of the kind with which the invention is adapted for use.
Figure 2:
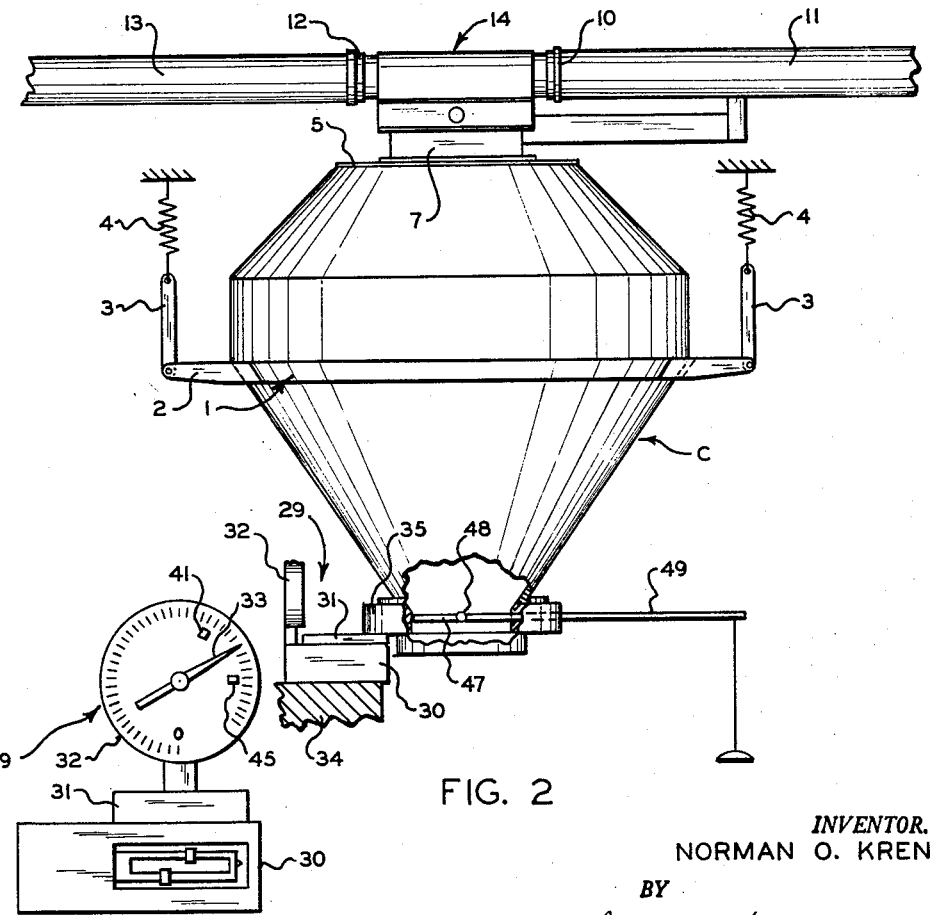
FIGURE 2 is a fragmentary, side elevational view of the apparatus shown in FIGURE 1.

The container is provided with an upper wall 5 having an inlet opening 6 therein which receives one end of a filler pipe 7, the opposite end of the filler pipe being received in a housing 8 and communicating with a bore 9 therein extending transversely of the axis of the filler pipe. At one end of the housing 8 is a fitting 10 by means of which a flexible conduit or tube 11 leading from the delivery side of the pneumatic conveying system may be joined to the housing, and a similar fitting 12 is provided at the opposite end of the housing 8 by means of which a similar flexible tube or conduit 13 leading to another container C and eventually returning to the flour supply source may be joined to the housing. The tubes 11 and 13, together with the housing 8, may form part of a conventional pneumatic flour conveying or delivering system by means of which flour or the like may be conveyed in the direction of the arrow $a$ in FIGURES 1 and 2 to and beyond the housing 8. A typical system of the type to which I refer is disclosed in FIGURE 6 of the present assignee's copending application Serial No. 817,321, now Patent No. 3,030,153, April 17, 1962, which is herewith incorporated by reference for its disclosure of the system which employs a blower fan in a line leading through the feeder valve of a storage bin to supply entrained flour to the system. Instead of feeding into a centrifugal separator mounted on the scaling hopper as in the aforementioned application, the delivery line feeds to housing 8 and the present hopper may be considered to deliver to a feeding valve which connects with a dough mixer as in the copending application.

Means designated generally by the reference character 14 is provided for controlling the delivery of material to the hopper C and comprises a butterfly valve 15 fixedly mounted intermediate its ends on a rock shaft 16 that extends transversely of the bore 9 of the housing below the bore 9, the shaft being journaled for rotation in the opposite sides of the housing. The valve 15 comprises two wings 17 and 18 of equal length and of such size and shape as snugly to close the inlet opening 6 when the valve is moved to its closed position. The arm 18 of the valve is of such length as to block completely the bore 9 of the housing 8 when the valve is in its fully opened position.

The construction and arrangement of the control means 14 are such that, when the valve is in the position shown at A in FIGURE 4, flour and air entering the housing 8 through the tube 11 will be deflected or diverted downwardly through the filler pipe 7 and into the hopper C as is indicated by the arrows $b$ in FIGURE 4. Air and dust may be expelled from the container C through the opening 6 on the opposite sides of the valve plate as is indicated by the arrows $c$ in FIGURE 4. When the valve plate 15 is in its fully closed position, as indicated by the letter B in FIGURE 4, the inlet opening of the container will be fully closed, whereupon flour and air entering the housing will traverse the bore 9 of the housing and pass directly to the tube 13, bypassing the container C.

Means for operating the valve means 14 is indicated by the reference character 19 and comprises a crank 20 fixed to the operating shaft 16 and being pivoted to a coupling member 21 fixed at one end of a piston rod 22 that reciprocably extends through one end of a double acting fluid cylinder 23 of conventional construction. The opposite end of the cylinder 23 is rigidly joined to one end of a piston rod 24 having its other end fixed to a piston that reciprocably extends through one end of another double acting fluid cylinder 25. The opposite end of the cylinder 25 is provided with a clevis 26 which pivotally mounts the cylinder 25 on an arm 27 that is supported by a bracket 28 that may be welded or otherwise suitably fixed to the housing 8. The arrangement of the cylinders 23, 25 and their associated parts is such that they constitute a variable length link between the crank 20 and the bracket arm 27 for effecting rocking movement of the crank and, consequently, rocking movement of the valve 15. The manner in which the cylinder devices 23 and 25 operate to effect movement of the valve will be explained hereinafter.

Apparatus constructed in accordance with the invention includes means 29 for regulating the operation of the valve mechanism and, in the embodiment disclosed in FIGURES 1–6, the regulating means comprises a typical platform scale of conventional construction having a base 30, a vertically movable platform 31, an indicator dial 32, a rotatable pointer 33, and conventional means (not shown) interconnecting the platform 31 and the pointer 33 for effecting rotation of the letter in response to vertical movement of the platform 31. To condition the regulating means 29 for operation, the base 30 is mounted on any suitable support 34 and in such position as to have its platform 31 in engagement with a ring or other part 35 mounted on the container C. The arrangement should be such that when the container is empty the indicator 33 of the scale will point to zero so as to indicate the absence of material in the container.

Figure 3:
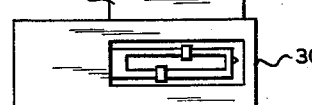
FIGURE 3 is an enlarged detail of a portion of the apparatus shown in FIGURE 2.

When the apparatus described thus far is conditioned for operation, the container will be empty and the valve 15 will be in its open position A so as to enable flour to be diverted from the delivery tube 11 into the hopper. In these positions of the parts, operation of the conveying apparatus will cause flour to be delivered into the container C at a maximum rate inasmuch as all of the flour delivered to the housing 8 is diverted by the valve arm 18 into the container. As the container fills with flour it will settle or move downwardly, due to the weight of the flour therein, so as to cause the indicating pointer 33 of the apparatus 29 to move clockwise (as shown in FIGURE 3) from its zero position.

Apparatus for operating the flow control valve 15 according to one embodiment of the invention is disclosed in FIGURE 6 as including an electrical system comprising a pair of power lines L–1 and L–2 connected to a suitable source of electrical energy. Connected across the power lines is a wire 36 that includes the advancing solenoid 37 of cylinder 23 and advancing solenoid 38 of cylinder 25. Also incorporated in the line 36 is the normally open, spring returned start button 39, which is initially depressed to open the valve 15 to its open position A. Also connected across the lines L–1, L–2 is a line 40 which includes the normally open limit switch 41 mounted on the scale 29, as shown in FIGURE 3, and the retract solenoid 43 of double acting pneumatic cylinder 23. Circuit line 44, similarly connected across the lines L–1, L–2, includes the normally open limit switch 45, also mounted on weight scale 29, and the retract solenoid 46 of double acting pneumatic cylinder 25. As is indicated in FIGURE 3, the switches 41 and 45 are mounted on the indicator dial 32 of the scale 29 in the path of rotation of the pointer 33, and the arrangement is such that movement of the pointer 33 in a clockwise direction to indicate an increase in weight of material in the container C first causes the pointer to engage and close the switch 41 and then to engage and close the switch 45. The switches 41 and 45 are normally open switches which are not actuated upon the return of pointer 33.

The valve operating means is conditioned for operation by closing the start switch 39 so as to effect energization of the advancing solenoids 37 and 38 to move valve 15 to open position. When the valve 15 is in its fully opened position, as is indicated at A, all of the flour or similar material entrained in the tube 11 will be delivered to the container C, thereby causing the latter gradually to move downwardly, due to the added weight of the material, and effecting movement of the indicator pointer 33 in a clockwise direction, as is viewed in FIGURE 3. When the indicator pointer engages the switch 41, the latter is closed and energizes solenoid 43, thus retracting the piston rod 22. This effects rocking of the crank 20 and the valve member 15 to an intermediate position D (see FIGURE 4) in which the inlet opening to the container C is only partially open. In this position of the valve 15, part of the material introduced to the housing 8 through the tube 11 will pass through the housing into the tube 13 and the remainder of the material will be diverted to the container, but at a slower rate than when the valve 15 is in its fully opened position.

The position of the switch 41 on the indicator dial should be such that, when it is closed by the pointer 33, the container will be filled to within about 3 to 5 pounds of the quantity of material that it is desired to contain. Following operation of the switch 41, material will continue to be introduced to the container at a relatively slow rate until such time as the weight of the container is such as to advance the pointer 33 to a position to enable the latter to engage and close the switch 45. Closing of the switch 45 energizes the solenoid 46 and effects retraction of the piston rod 24 into the cylinder 25, thereby exerting a rocking force on the crank 20 to effect additional rocking of the valve member 15 to its fully closed position B. When the valve 15 is in its fully closed position, all of the material introduced to the housing 8 via the tube 11 will bypass the container C and be conducted along the tube 13. That is, the valve 15 will be in such position as to disable the introduction of material to the container.

The location of the switch 45 on the indicator dial 32 should be such that operation of the switch coincides with the delivery to the container of a predetermined quantity of material. The switches 41 and 45 may, if desired, be adjustable relatively to the indicator dial to permit more or less material to be accumultaed in the container. This, coupled with the incremental or sequential operation of the valve 15 toward its closed position, enables the quantity of material admitted to the container to be controlled with considerably greater precision than has been possible heretofore.

The discharge end of the container C is provided with a conventional gate valve 47 which is mounted on a rock shaft 48 that is journaled for rotation in the ring 35. An operating lever 49 may be rigidly connected to the rock shaft 48 for rocking the latter so as to permit discharge of the contents of the container when desired. The discharge of the contents of the container will cause the needle or pointer 33 to return to its zero position and valve 15 will remain in its closed position until such time as the start switch 39 is closed.

Another embodiment of the invention is shown in FIGURES 7 and 8, in which only one double acting cylinder 47 is employed and has its piston rod 22' connected with the crank arm 20 to move the valve 15 in the manner desired. In this form of the invention a sealed control box 48 reciprocably mounts a slide rod 49 fixed to the rod 22 by means of an arm 50. Provided in the casing 48 in position to be actuated by the collar 51 on the slide rod 49 which moves with plunger rod 22 is a limit switch 52, slideable longitudinally on a vernier rod support 53 to various adjusted positions. Switch 52 is a normally closed switch provided in the circuit line 41 in FIGURE 8 to deenergize the retract solenoid 54 of cylinder 47 when it has retracted the valve 15 part way to the intermediate position D. In this embodiment of the invention like numerals are used to identify the parts previously identified and provided in line 36 which includes start switch 39 is the advancing solenoid 55 of cylinder 47 which moves valve 15 to open position.

In operation, when push button 39 is depressed, solenoid 55 moves the valve 15 to open position. When flour or the like fills the hopper to the extent that pointer 33 engages and closes switch 41, retract solenoid 54 is energized. As cylinder rod 22' is retracted, collar 51 trips limit switch 52 to deenergize solenoid 54. However, when flour or the like fills the hopper to the extent that pointer 33 engages and closes switch 45, solenoid 54 is again energized and valve 15 is retracted to closed position. The switches 41 and 45 are unaffected by the return of pointer 33.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. In a fluid conveying system having longitudinal conduit means through which fluid entrained particulate material may be conveyed: a container having an inlet opening in communication with said conduit means intermediate the ends of the latter, said inlet opening extending transversely of said conduit means; flow control means movable from a first position in which it blocks said conduit means and diverts material from said conduit means into said container via said inlet, to a second position in which said flow control means blocks said inlet to disable the entry of material into said inlet and enables said material to be conveyed along said conduit means bypassing said container; and operating means connected to said control means and operable in response to predetermined amounts of material being delivered to said container to move said control means from said first position to said second position in successive increments.

2. In a fluid conveying system having longitudinal conduit means through which fluid entrained material may be conveyed; a container having an inlet extending transversely of said conduit means; a valve housing in communication with said inlet and with said conduit means intermediate the ends of the latter; valve means in said housing; means mounting said valve means for movement from a first position in which blocks said conduit means and diverts material from said conduit means into said container via said inlet, to a second position in which said valve means blocks said inlet to disable the entry of material into said inlet and enables said material to be conveyed along said conduit means bypassing said container; and operating means connected to said valve means for moving the latter incrementally from said first position to said second position.

3. The apparatus set forth in claim 2 including means mounting said container for movements in accordance with the weight of material therein; and actuating means interconnecting said container and said operating means for actuating the latter in accordance with the movements of said container.

References Cited in the file of this patent

UNITED STATES PATENTS

| | | |
|---|---|---|
| 2,033,586 | Noble | Mar. 10, 1936 |
| 2,552,930 | Booth | May 15, 1951 |
| 2,587,787 | Sublett | Mar. 4, 1952 |
| 2,688,518 | Krenke | Sept. 7, 1954 |
| 2,829,856 | Gregory | Apr. 8, 1958 |
| 2,844,349 | Hudson | July 22, 1958 |
| 3,030,153 | Krenke | Apr. 17, 1962 |
| 3,102,603 | Kerr | Sept. 3, 1963 |